United States Patent [19]
Loren

[11] Patent Number: 6,042,354
[45] Date of Patent: Mar. 28, 2000

[54] GAS INJECTION APPARATUS FOR GAS ASSISTED INJECTION MOLDING SYSTEM

[76] Inventor: Norman S. Loren, 24874 Chalk Farm Rd., Warren, Mich. 48091

[21] Appl. No.: 09/027,414

[22] Filed: Feb. 2, 1998

[51] Int. Cl.⁷ .................................................. B29C 45/17
[52] U.S. Cl. ................... 425/130; 264/328.12; 264/572; 425/546; 425/577; 425/812
[58] Field of Search ..................................... 425/130, 546, 425/812, 577; 264/572, 328.12

[56] References Cited

U.S. PATENT DOCUMENTS

| | | | |
|---|---|---|---|
| 4,555,225 | 11/1985 | Hendry | 425/127 |
| 4,740,150 | 4/1988 | Sayer | 425/542 |
| 4,943,407 | 7/1990 | Hendry | 264/572 |
| 5,044,924 | 9/1991 | Loren | 425/542 |
| 5,151,278 | 9/1992 | Baxi et al. | 425/130 |
| 5,164,200 | 11/1992 | Johnson | 425/130 |
| 5,186,884 | 2/1993 | Hendry | 264/572 |
| 5,198,177 | 3/1993 | Sugiyama et al. | 264/572 |
| 5,198,238 | 3/1993 | Baxi | 425/130 |
| 5,232,654 | 8/1993 | Aida et al. | 264/572 |
| 5,232,711 | 8/1993 | Hendry | 425/130 |
| 5,256,047 | 10/1993 | Moldovanyi | 425/130 |
| 5,282,730 | 2/1994 | Daniels et al. | 425/130 |
| 5,409,659 | 4/1995 | Matsumoto et al. | 264/572 |
| 5,439,370 | 8/1995 | Lalaouna et al. | 425/577 |
| 5,464,342 | 11/1995 | Marik et al. | 264/572 |
| 5,482,669 | 1/1996 | Shah | 264/572 |
| 5,511,967 | 4/1996 | Berdan | 264/572 |
| 5,665,281 | 9/1997 | Drummond | 425/577 |
| 5,895,667 | 4/1999 | Eckardt et al. | 264/572 |
| 5,900,198 | 5/1999 | Hori | 264/572 |

FOREIGN PATENT DOCUMENTS

| | | | |
|---|---|---|---|
| 0577840 | 1/1994 | European Pat. Off. | 264/572 |
| 2 652 538 A1 | 4/1991 | France . | |
| 61-235108 | 10/1986 | Japan | 425/444 |
| 5-104530 | 4/1993 | Japan | 425/444 |

*Primary Examiner*—Robert Davis
*Attorney, Agent, or Firm*—Young & Basile, P.C.

[57] ABSTRACT

A gas injection apparatus for use with a gas assisted injection molding system. The gas injection apparatus includes a mold part defining an elongated bore communicating upstream with a source of gas and downstream with a mold cavity, and an elongated pin positioned in the bore and coacting with the bore to define a gas flow passage therebetween for movement of gas from the gas source to the mold cavity. The bore and pin include first, second and third corresponding portions. The pin and bore define an annular axial clearance in the first portion, a close fit with an axial linear passage in the second portion and an annular axial passage in the third portion. This arrangement ensures that the pin will remain concentric with respect to the bore so as to discourage entry of resin into the annular axial passage.

29 Claims, 5 Drawing Sheets

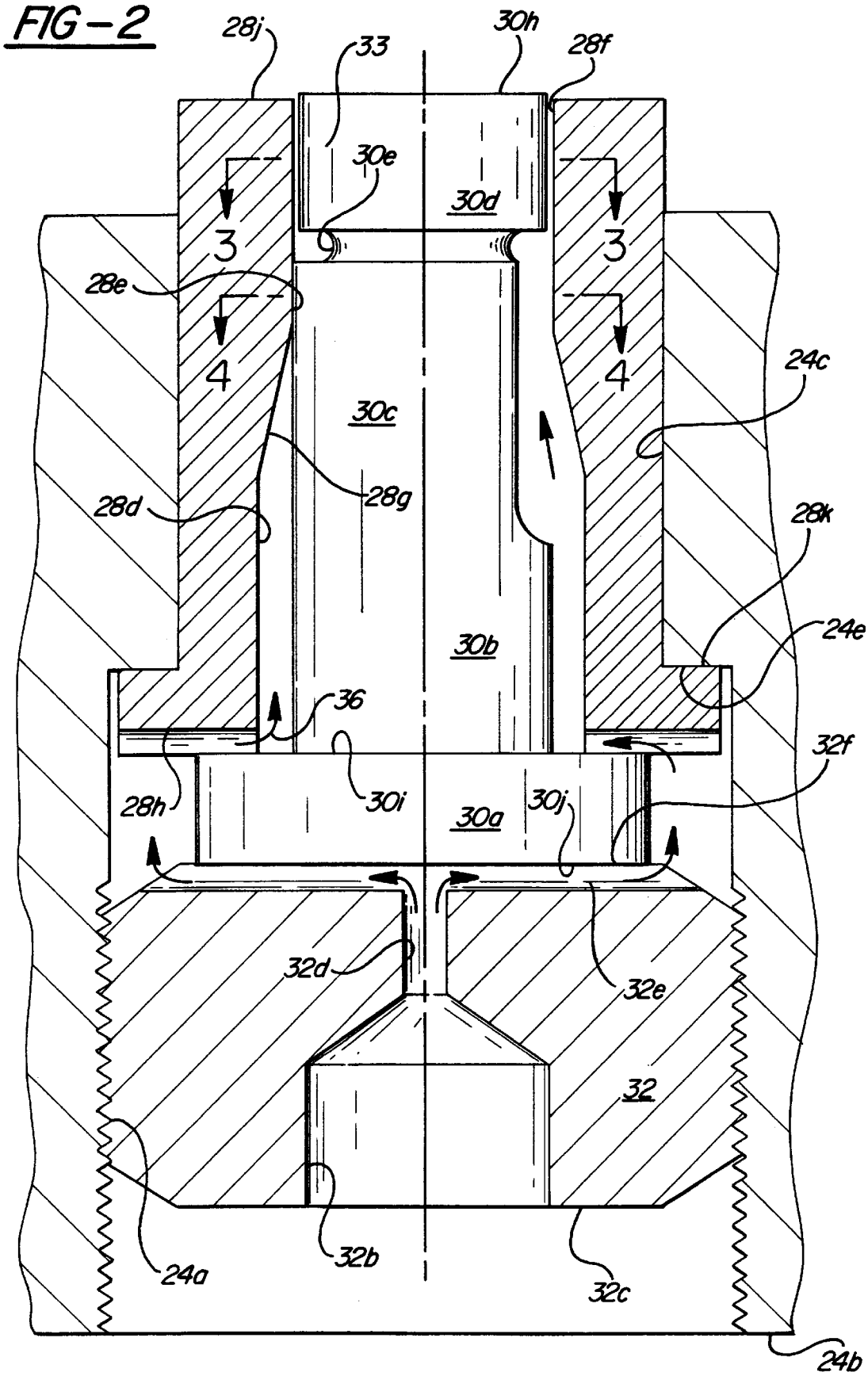

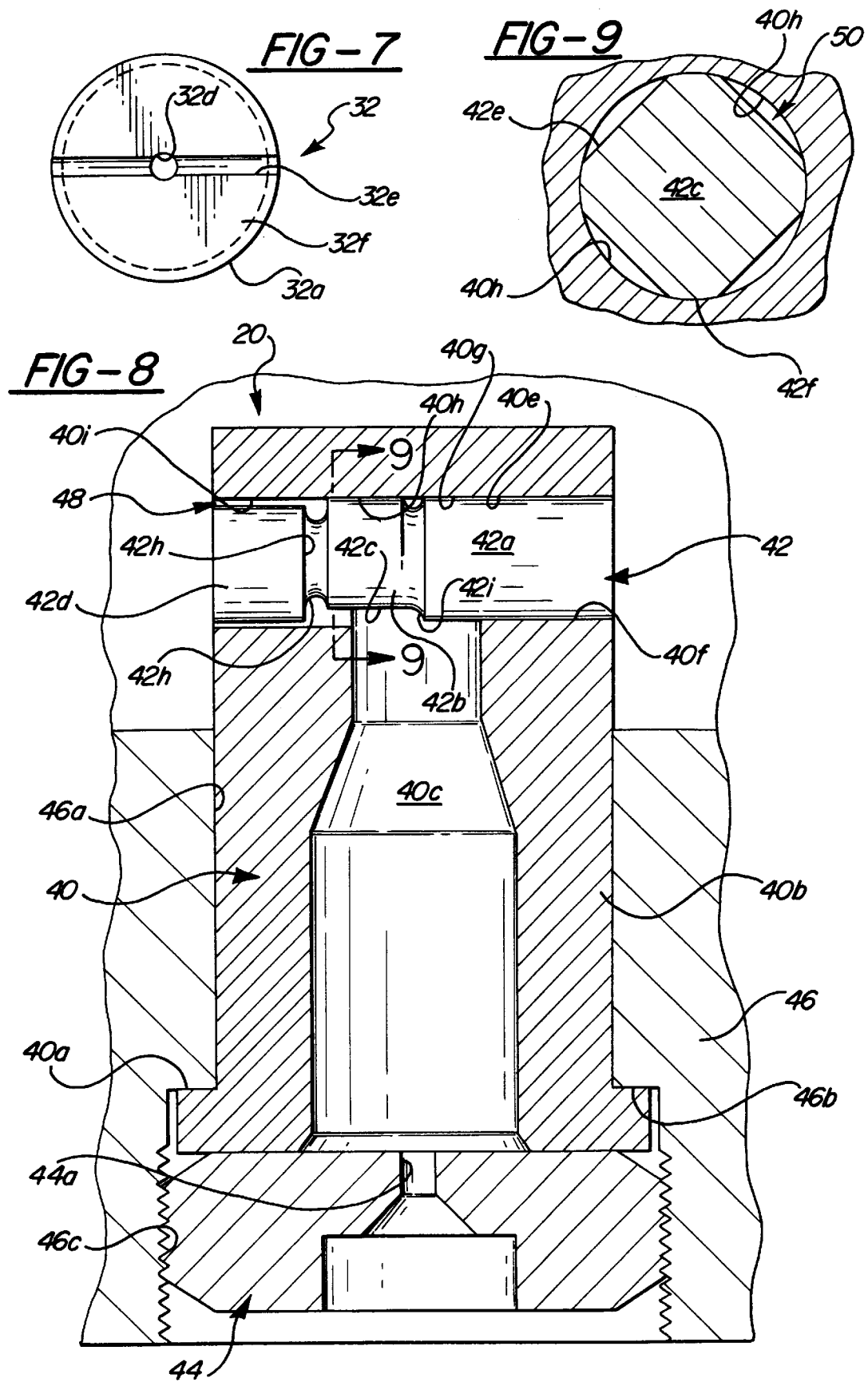

GAS INJECTION APPARATUS FOR GAS ASSISTED INJECTION MOLDING SYSTEM

FIELD OF THE INVENTION

This invention relates to injection molding and more particularly to gas assisted injection molding.

BACKGROUND OF THE INVENTION

It is desirable in injection molding to urge the molten thermoplastic resin material into contact with the mold surfaces by exerting pressure on the resin. This aids the external surface of the plastic material in assuming the precise shape dictated by the mold surface. The pressure also assists in the filling of the mold space with molten resin even if the space is elongated or narrow and is normally difficult to fill.

In gas assisted injection molding, the articles are produced by injecting molten resin into the mold cavity and thereafter injecting a quantity of pressurized gas into the resin to fill out the mold cavity and form a hollow portion in the resin. The gas is preferably an inert gas such, for example, as nitrogen. Pressure is maintained on the gas in the hollow gas space within the resin until the resin has sufficiently set, whereafter the pressurized gas is released from the molded part hollow space and the molded part is removed from the mold cavity.

The gas assisted procedure is advantageous since the molded part produced utilizes somewhat less plastic material and is lighter than if the part was solid plastic. More importantly, the plastic in the gas assisted procedure will not have a tendency to shrink away from the mold walls during cooling since the internal gas pressure will keep it pressed against the walls, thereby minimizing or eliminating surface blemishes such as sink marks. Further, the gas assisted procedure eliminates the need to utilize the screw ram of the injection molding machine to pack out the mold during the molding cycle, thereby minimizing or eliminating molded in stresses in the molded part.

Various methods are known to inject gas into the resin to form the hollow body plastic article including injecting the gas into the sprue, injecting the gas into the runner, or injecting the gas directly into the mold cavity itself. The gas flow passageways are typically formed as round holes or as annular passageways. One problem with the prior art gas injection systems has been that the holes or passageways become clogged with resin during the course of carrying out the total molding operation. This clogging requires costly down time while the blockage is cleared. Clogging generally can occur during the initial stage of resin injection when pressures are relatively high. Partial clogging of the gas passage reduces the flow of gas in and out of the resin to the point where the molding operation produces scrap parts.

Various attempts have been made to address this clogging or blockage problem and attendant down time. One attempt is shown in U.S. Pat. No. 4,555,225 wherein a reciprocating pin is utilized to resist entry of resin into the gas passageway. Similar solutions are found in U.S. Pat. Nos. 4,740,150, 4,943,407, 5,044,924, 5,198,177, 5,198,238, 5,232,711 and 5,282,730. In each case, however, the solutions are complex and costly to construct and maintain.

Further attempts to address this blockage problem are shown in U.S. Pat. No. 5,151,278, 5,256,047 and French Patent No. 2,652,538.

In U.S. Pat. No. 5,151,278, a pin is located in a bore with an annular clearance to form a gas passageway of sufficient size for flow of gas in and out of the resin and the system relies on reciprocating action between the pin and the adjacent bore to wipe away any resin clogging the annular clearance. However, many resins used in the gas assisted injection molding process readily flow into such clearances. It is also likely for the pin to be out of concentricity with the bore with the result that the clearance between the pin and bore is exaggerated in certain eccentric portions of the clearance.

French Patent No. 2,652,538 discloses a pin located in a bore with a close fitting annular clearance which resists entry of resin into the clearance. However, the close fitting clearance limits the flow of gas into and out of the resin. This is most noticeable as the gas pressure in the resin is vented to atmosphere. As the gas pressure is reduced, the rate of flow of the gas is also reduced and the small clearance between the pin and the bore further reduces the rate of flow which in turn increases the cycle time for the total molding operation.

SUMMARY OF THE INVENTION

This invention is directed to an improved gas injection apparatus for use with a gas assisted injection molding system.

More particularly, this invention is directed to a gas injection apparatus which allows the ready flow of gas into and out of the mold cavity while resisting plugging of the gas passage by the resin during resin injection, gas injection and gas venting.

The gas injection apparatus of the invention includes means defining an elongated bore communicating upstream with a source of gas and downstream with a mold cavity, and an elongated pin positioned in the bore and coacting with the bore to define a gas flow passage therebetween for movement of gas from the gas source to the mold cavity and to thereafter vent the gas from the mold cavity.

According to the invention, the bore includes a downstream bore portion and an upstream bore portion adjoining the downstream portion; the pin includes a downstream pin portion positioned in the downstream bore portion and an upstream pin portion adjoining the downstream pin portion and positioned in the upstream bore portion; the downstream bore portion has a diameter greater than the downstream pin portion so as to define an annular axial passage between the downstream bore portion and the downstream pin portion; the upstream bore portion has a diameter generally corresponding to the diameter of the upstream pin portion; the annular interface of the upstream bore portion and the upstream pin portion includes a radial recess at at least one circumferential location around the annular interface defining a linear axial passage extending axially through the annular interface and communicating with the annular axial passage; and the generally corresponding diameters of the upstream bore portion and the upstream pin portion define a close fit to maintain the downstream pin portion centered in the downstream bore portion so as to maintain a substantially uniform radial clearance dimension throughout the circumferential extent of the annular axial passage. This specific bore and pin construction provides an adequate flow path for the gas while resisting the resin plugging problem by ensuring that the pin will remain concentric with respect to the bore.

According to a further feature of the invention, the pin further includes a circumferential groove at the juncture of the upstream and downstream pin portions. The groove acts as a manifold to distribute the gas flowing through the axial linear passageways uniformly to the annular axial passageway defined at the interface of the upstream bore portion and the upstream pin portion.

According to a further feature of the invention, the periphery of the upstream pin portion is configured in cross section to define a plurality of axially extending circumferentially spaced flats interconnected by a plurality of full diameter axially extending land portions with the flats coacting with the upstream bore portion to define a plurality of circumferentially spaced linear axial passages therebetween communicating upstream with the source of gas and downstream with the annular axial passage. This arrangement provides a generally uniform and adequate flow of gas to and through the annular axial passage while maintaining the concentric relation of the pin to the bore.

According to a further feature of the invention, the bore includes a first upstream portion and a second downstream portion adjoining the first portion; the pin includes a first upstream portion positioned in the first bore portion and a second downstream portion adjoining the first portion and positioned in the second bore portion; the pin has a substantially uniform diameter throughout the first and second pin portions generally corresponding to the diameter of the second bore portion; and the periphery of the second pin portion is radially recessed at at least one circumferential location around the periphery of the second pin portion to define an axial linear passageway between the second pin portion and the second bore portion. This arrangement assures adequate gas flow through the linear passageway while facilitating manufacturability of the apparatus.

According to a further feature of the invention, the bore further includes a third portion downstream of and adjoining the second bore portion; and the pin further includes a third portion downstream of and adjoining the second pin portion, positioned in the third bore portion, and having a diameter less than the diameter of the third bore portion so as to define an annular axial passageway therebetween communicating at its upstream end with the downstream end of the axial linear passageway. This arrangement provides the desired axial linear passageway and annular axial passageway while facilitating manufacturability of the apparatus.

In one embodiment of the invention the gas is delivered to the bore in a direction generally coaxial with the bore; in a second embodiment the gas is delivered to the bore in a direction generally at an angle to the axis of the bore and the bore functions to deliver gas to the mold cavity at one side of the axis of the delivery bore; and in a third embodiment the gas is delivered to the bore at an angle to the bore axis and the gas is delivered to the mold cavity in more than one direction. The invention apparatus may be positioned in the mold from the mold cavity side or from the opposite side. Preferably the invention apparatus communicates with the resin at the runner or article defining cavity but may communicate at other locations such as the sprue.

BRIEF DESCRIPTION OF THE DRAWINGS

FIG. 2 is a detail view taken within the circle 2 of FIG. 1;

FIG. 7 is an end view of a plug forming a part of the gas injection apparatus;

FIG. 8 is a cross-sectional view of another embodiment of the gas injection apparatus according to the invention;

FIG. 9 is a cross-sectional view taken on line 9—9 of FIG. 8;

DETAILED DESCRIPTION OF THE PREFERRED EMBODIMENT

The invention gas injection apparatus is intended for use in association with a gas assisted injection molding system of the type in which hot resin is injected into a mold cavity, gas is injected into the resin to fill out the mold cavity with resin, the gas is held at a pressure while the resin sets up, the gas is vented from the mold, and the mold is opened to remove the molded part.

Figure 1:
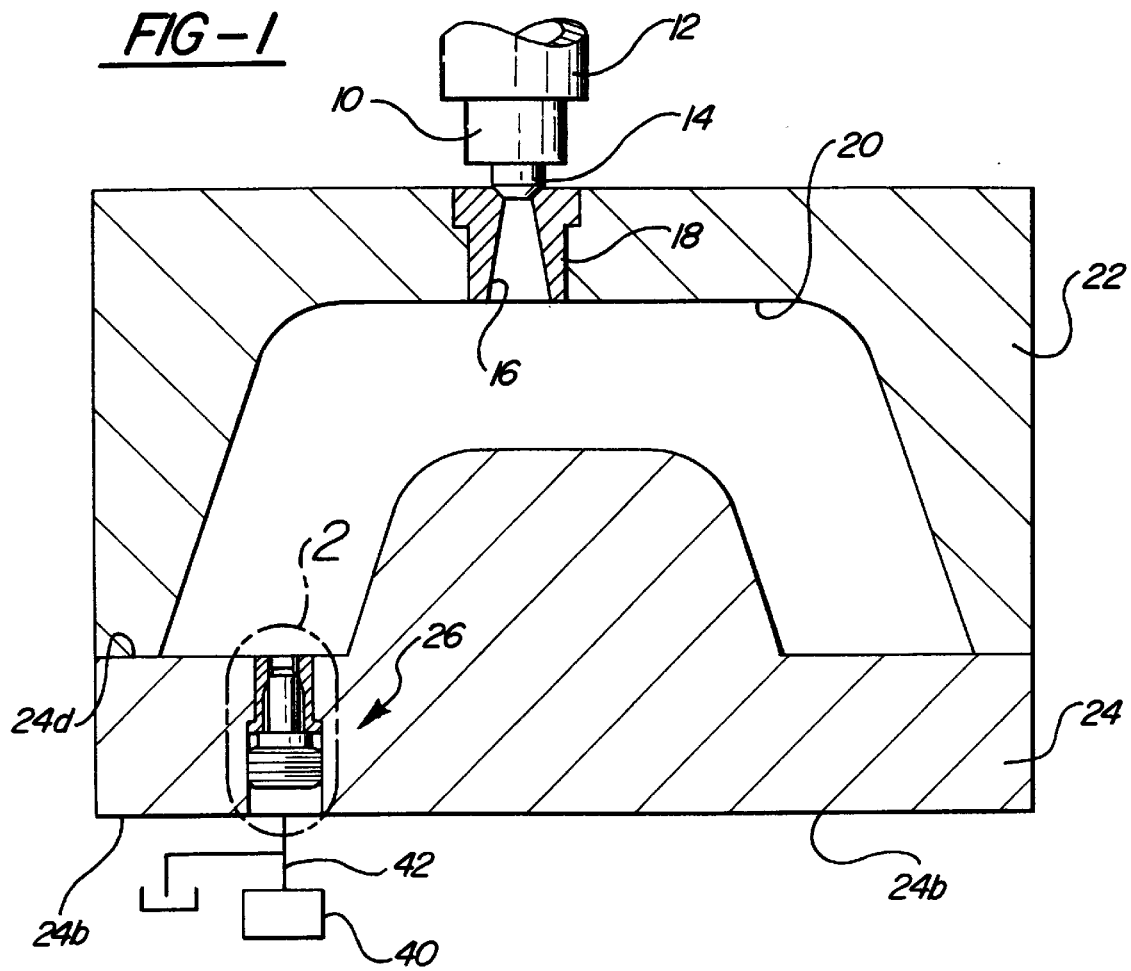
FIG. 1 is a somewhat schematic, cross-sectional view of a gas assisted injection molding system employing a gas injection apparatus according to the invention.
Figure 3:
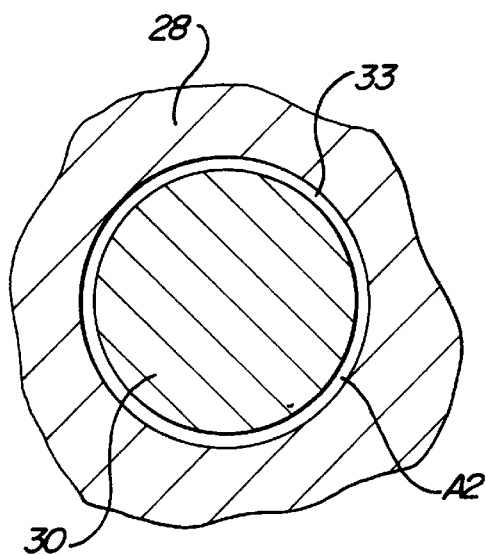
FIGS. 3 and 4 are cross-sectional views taken respectively on lines 3—3 and 4—4 of FIG. 2.

In the injection molding system seen schematically in FIG. 1, an injection nozzle 10 is connected in known manner to an injection molding machine 12 including a screw or plunger (not shown) which is actuated in known manner to force resin through nozzle outlet 14 so as to inject a quantity of hot resin through a sprue 16 defined by a sprue bushing 18 into a mold cavity 20 defined by first and second mold halves 22 and 24. The quantity of resin injected is a "short shot", that is, less than the amount required to totally fill the mold cavity 20.

Following introduction of the resin into the mold cavity, pressurized gas such as nitrogen is introduced into the mold cavity by a gas injection apparatus 26, according to the invention, to fill out the mold cavity with resin. The part to be molded will typically have thicker and thinner portions and the thicker portions will act as an internal runner system to define a flow path for the nitrogen. Since the thicker portions have a significantly higher resin melt temperature, the gas will follow the path of least resistance and the resin material in the thicker portions will continue to flow by virtue of the gas pressure so as to fill out the mold with the resin. Gas pressure is maintained within the mold in the hollow portion of resin until such time as the cooling cycle of the part is sufficient and the resin material has set up, whereafter the gas pressure is suitably vented and the mold is opened to remove the part. The present invention concerns the improved gas injection apparatus 26 for injecting gas into the mold cavity and venting gas from the mold cavity.

Gas injection apparatus 26, broadly considered, includes a sleeve 28, a pin 30, and a plug 32 all formed of a suitable material such as a suitable steel.

Figure 5:
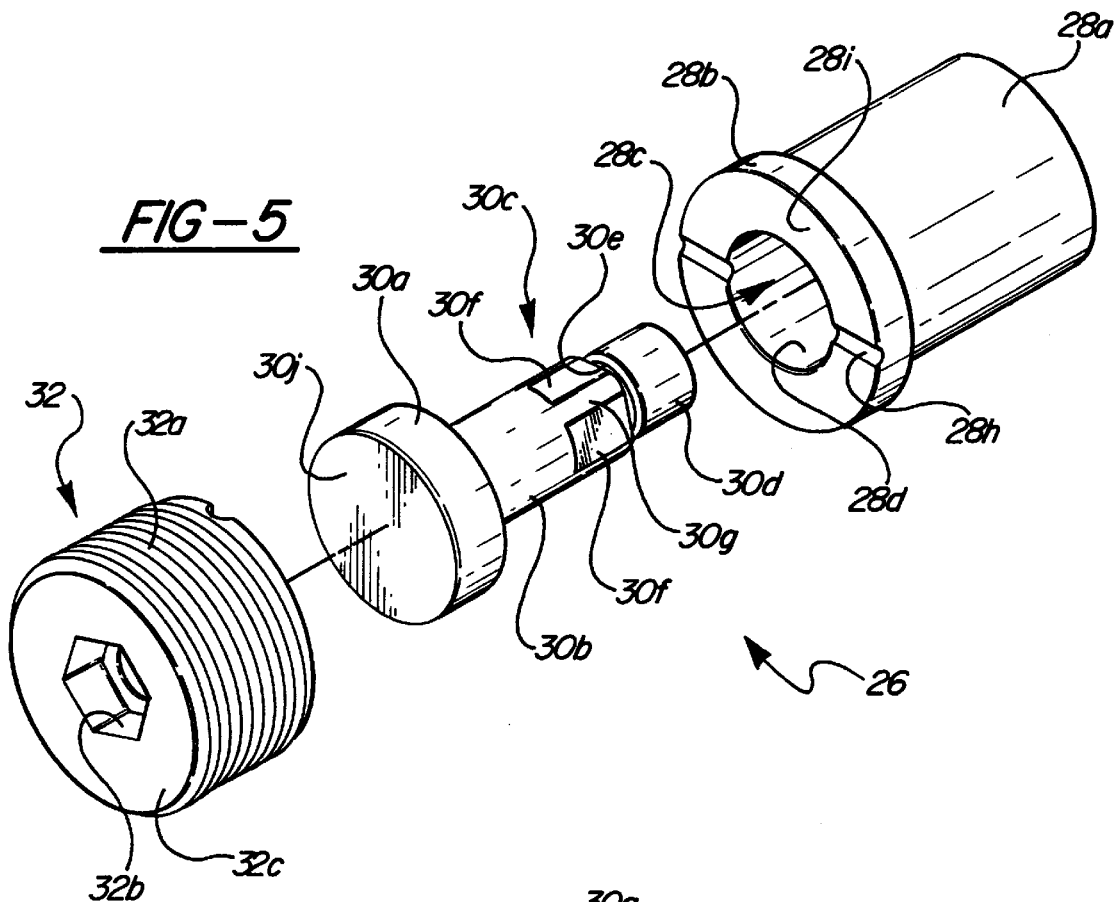
FIG. 5 is an exploded view of the gas injection apparatus.

Sleeve 28 (FIGS. 2 and 5) includes a main body cylindrical portion 28a and a flange portion 28b. Sleeve 28 defines a central bore 28c including an upstream portion 28d, an intermediate portion 28e positioned downstream of portion 28d, and a portion 28f positioned downstream of and adjoining portion 28e and having the same diameter as portion 28e. The downstream section of bore portion 28d is conical as seen at 28g. A pair of diametrically opposed grooves 28h are provided in the upstream face 28i of flange portion 28b.

Pin 30 is solid and is sized to fit within sleeve 28. Pin 30 includes a flange portion 30a, and a main body portion including a first upstream pin portion 30*b*, a second intermediate pin portion 30*c* positioned downstream of portion 30*b*, and a third pin portion 30*d* downstream of 30*c*.

Pin portions 30*b* and 30*c* are substantially uniform in diameter and have a diameter generally corresponding to the diameter of sleeve bore portion 28*e* and less than the diameter of sleeve bore portion 28*d*. Pin portion 30*d* has a diameter less than the diameter of pin portions 30*b* and 30*c* and less than the diameter of sleeve bore portion 28*f*. An annular circumferential groove 30*e* is provided at the juncture of pin portions 30*c* and 30*d*. Alternatively, the circumferential groove may be provided in the bore at the juncture of bore portions 28*e* and 28*f*. The radial clearance between downstream bore portion 28*f* and downstream pin portion 30*d* defines an annular axially extending passageway 33.

Figure 6:
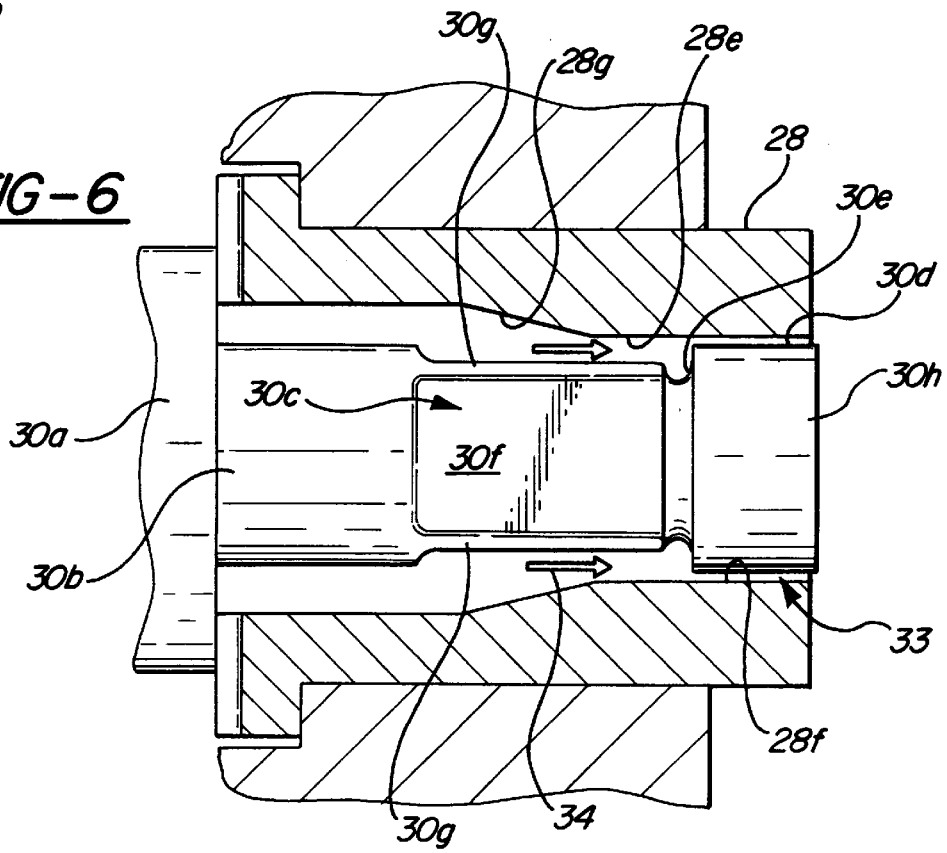
FIG. 6 is a detail fragmentary cross-sectional view of a portion of the gas injection apparatus.

The periphery of pin portion 30*c* is radially recessed as at least one circumferential location around the periphery of the pin portion 30*c* to define an axial linear passageway between pin portion 30*c* and bore portion 28*e* with the pin positioned in the sleeve bore. As shown, the radial recessing may be constituted by a series of four flats 30*f* (see also FIG. 4) separated by four full diameter arcuate land portions 30*g* so that, with the pin positioned in the bore, four axial linear passageways 34 (see also FIG. 6) are defined between pin portion 30*c* and bore portion 28*e*.

Plug 32 is externally threaded at 32*a*, includes a socket 32*b* in the upstream face 32*c* of the plug, and includes a central passage 32*d* communicating with a diametric groove 32*e* (FIG. 7) on the downstream face 32*f* of the plug.

The gas injection apparatus of the invention is mounted in mold half 24 of the mold structure and, specifically, is received in a bore in the mold half 24 including a threaded bore portion 24*a* opening in the lower face 24*b* of mold half 24 and a smooth bore portion 24*c* opening in the upper face 24*d* of mold half 24. Threaded bore portion 24*a* has a diameter generally corresponding to the diameter of plug 32 and smooth bore portion 24*c* has a diameter generally corresponding to the diameter of main body portion 28*a* of sleeve 28.

In the assembled relation of the gas assisted injection molding system and the gas injection apparatus, sleeve 28 is positioned in bore 24*c* with the upper annular edge 28*j* of the sleeve projecting beyond mold surface 24*d* and with the upper annular surface 28*k* of flange 28*b* seated against an annular shoulder 24*e* formed at the juncture of threaded bore portion 24*a* and smooth bore portion 24*c*; pin 30 is positioned in sleeve 28 with the upper end 30*h* of the pin substantially flush with sleeve surface 28*j* and with the upper annular surface 30*i* of flange 30*a* seated against the lower face 28*i* of the sleeve; and plug 32 is threaded upwardly into threaded bore 24*a* to position the upper face 32*f* of the plug against the lower end face 30*j* of the pin.

Although the relative dimensions of the parts may of course vary depending upon the particular part being formed and the specific resin being employed, in one successful embodiment of the invention the clearance between pin portion 30*d* and sleeve bore portion 28*f* was 0.0015 inches; the clearance between the corner or land portions 30*g* of pin portion 30*c* and bore 28*e* was 0.0005 inches; the maximal clearance between flats 30*f* and bore portion 28*e* was 0.010 inches; and groove 30*e* had a depth, as measured from pin portion 30*d*, of 0.010 inches.

OPERATION

Following injection of a suitable resin into cavity 20 via nozzle 10, a gas is injected into the mold cavity 20 from a suitable source 40 of an inert gas such as nitrogen to pack out the resin against the mold wall surfaces. The gas flows from the source 40 through a suitable conduit 42 into the lower end of bore portion 24*a*, axially upwardly through plug socket 32*b* and plug passage 32*d*; radially outwardly through diametric grooves 32*e*; around pin flange portion 30*a*; radially inwardly through sleeve, grooves 28*h*; axially upwardly through an annular space 36 defined between sleeve bore portion 28*d* and pin portion 30*b*; further axially upwardly through the four linear axial passages 34 defined between the flats 30*f* and the sleeve bore portion 28*e*; circumferentially around groove 30*e* to evenly distribute the gas flow in a circumferential sense; and then axially upwardly through the annular space 33 defined between pin portion 30*d* and sleeve bore portion 28*f* into the mold cavity. The full diameter land portions 30*g* of the pin act to maintain the pin in precise concentric relation to the sleeve so that the annular space 33 defined between pin portion 30*d* and bore portion 28*f* exhibits a uniform radial clearance throughout the circumference of the space while the linear passageways 34 defined by the flats 30*f* provide an adequate flow of gas through the apparatus and the groove 30*e* ensures that the gas flow will be distributed substantially uniformly around the circumference of the pin so that the flow through annular passage 33 will be uniform as measured circumferentially around pin portion 30*d*.

In a preferred embodiment of the invention, the combined area of the four areas A1 defined between the flats 30*f* and the adjacent bore portion 28*e* is equal to the area A2 of annular passageway 33 so that the gas flows smoothly through the injection apparatus at a substantially constant speed. The engagement of the corner land portions 30*g* of the pin portion 30*c* with the adjacent bore portion of the sleeve ensures that the pin portion 30*d* will be maintained in a concentric relation with respect to the adjacent bore portion 28*f* so that no areas of eccentricity may develop in the annular clearance between pin portion 30*d* and bore portion 28*f* such as would create a large radial gap to allow a flow of resin into the clearance.

Accordingly, once a specific clearance has been established between the pin portion 30*d* and the adjacent bore portion 28*f* such as would allow the free flow of gas into the mold cavity but preclude flow of the specific resin being employed into the clearance, the system can be operated repeatedly with the assurance that the pin portion 30*d* will not take on an eccentricity with respect to the bore portion 28*f* such as would increase the clearance between the pin and the bore to an extent to allow resin to enter and plug the annular passageway.

The alternate embodiment of gas injection apparatus seen in FIG. 8 is utilized in situations where it is desired to impart a right angle turn to the gas prior to its injection into the mold cavity 20.

The injection apparatus of the alternate embodiment shown in FIG. 8 includes a sleeve 40, a pin 42, and a plug 44.

Sleeve 40 includes a flange 40*a* and a main body portion 40*b*, and defines a central upwardly extending axial bore 40*c* and an upper cross bore 40*e* communicating with central bore 40*c* and opening in mold cavity 20.

The main body portion 40*b* of the sleeve is positioned in a smooth bore 46*a* of a mold part 46 with the upper annular face of flange portion 40*a* seated against a shoulder 46*b* formed at the juncture of smooth bore 46*a* and threaded bore 46*c*. Plug 44 is threadably received in threaded bore 46*c*, engages the lower face of sleeve flange portion 40*a* to maintain the sleeve in position in bore 46a, and defines a central passage 44a for passage of gas upwardly into the central bore 40c of the sleeve.

Pin 42 includes a mounting portion 42a, a first upstream portion 42b, a second intermediate portion 42c downstream of portion 42b, and a third portion 42d downstream of portion 42c. Portions 42b and 42c have identical diameters. Portion 42d has a diameter less than the diameter of portion 42b/c. The diameter of portion 42b/c is generally the same as the diameter of portion 42a. Mounting portion 42a is received with a press fit in an end portion 40f of cross bore portion 40e.

Cross bore 40e, in addition to end bore portion 40f, includes a first upstream portion 40g, a second intermediate portion 40h downstream of portion 40g, and a third downstream portion 40i.

Pin portion 42d is positioned in bore portion 40i and pin portion 42b is positioned in bore portion 40g. Pin portion 42d has a lesser diameter than pin portion 42b/c and coacts with bore portion 40i to define an annular axial passage 48. The periphery of pin portion 42b/c is radially recessed at at least one circumferential location around the periphery of the pin portion to define an axial linear passageway between the pin portion 42c and bore 40h. Preferably, and as shown in detail in FIG. 9, the radial recessing may consist of four flats 42e separated by four full diameter corner or land portions 42f. As with the FIGS. 1–7 embodiment, the corner portions 42f serve to ensure that the pin remains in a concentric relation with respect to bore 40i while the passageways 50 defined by the flats 42e ensure an adequate smooth flow of gas through the apparatus. Again as with the FIGS. 1–7 embodiment, the combined areas defined between the flats 42e and the adjacent bore 40h preferably equal the area of the annular passageway 48 defined between pin portion 42d and bore portion 40i so as to ensure substantially uniform velocity of gas flow through the injection apparatus. Circumferential grooves 42h and 42i serve as manifolds to ensure equal circumferential distribution of gas around pin 42 as the gas flows upwardly to the pin through plug passage 42a and sleeve bore 40c.

Figure 4:
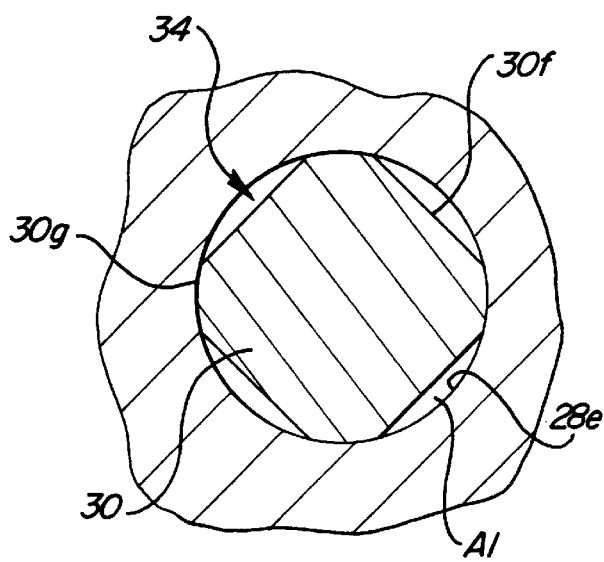
Figure 10:
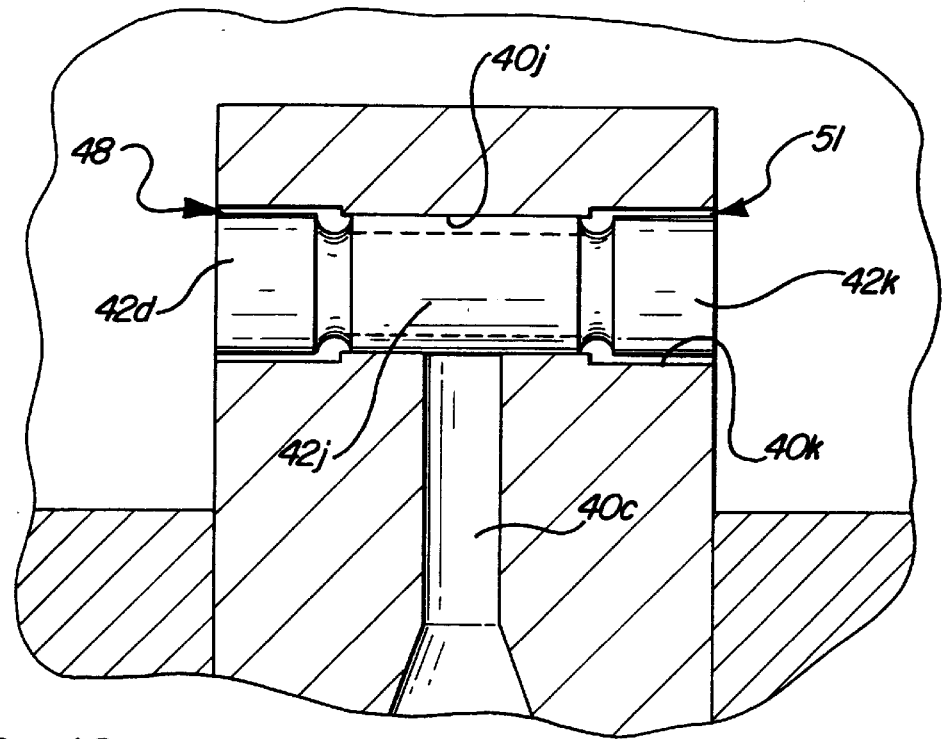
FIG. 10 is a cross-sectional view of a further embodiment of gas injection apparatus according to the invention.

The injection apparatus of the FIG. 10 embodiment is generally similar to the apparatus of the FIG. 8 embodiment with the exception that the gas flow into the mold cavity, rather than being only in one direction as seen in FIG. 8, extends in both lateral directions from the upper end of central bore 40c and, for this purpose, the left half of pin 42 is duplicated at the right half in the FIG. 10 embodiment so that the pin is symmetrical and so that linear axial passageways leading to annular passageways are defined in both directions from the central gas delivery axis. Specifically, linear axial passageways are defined between center pin portion 42j and central bore portion 40j for communication with an annular axial passageway 48 (as in the FIG. 8 embodiment) and, additionally, linear axial passageways are defined between pin portion 42j and bore portion 40j for communication with an annular axial passageway 51 defined between pin end portion 42k and end bore portion 40j. As with the FIGS. 1–7 embodiment and the FIG. 8 embodiment, the linear axial passageways between the pin and the bore are defined, both in left and right directions as viewed in FIG. 10, by a series of circumferentially spaced flats and land portions (as seen in FIGS. 4 and 9) whereby the land portions act to maintain the pin in concentric relation to the bore and the flats act in combination with the bore to define a plurality of circumferentially spaced linear axial passageways for communication with the respective annular axial passageway.

Figure 11:
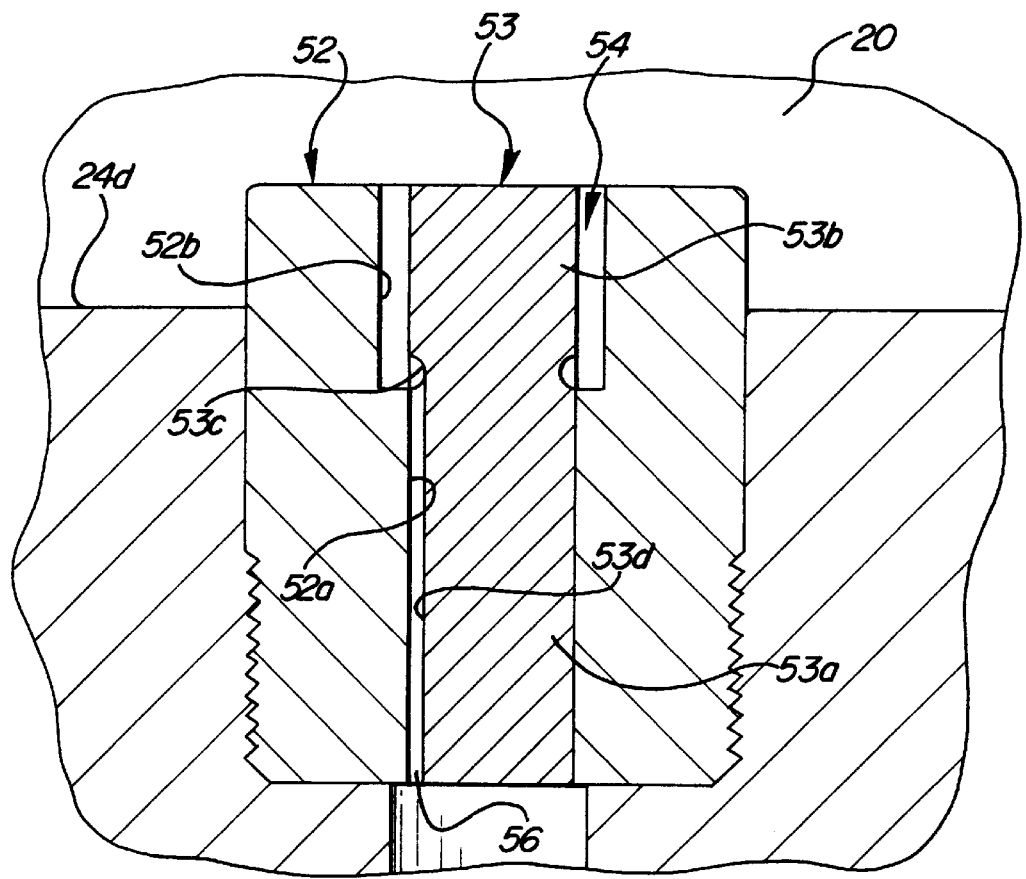
FIG. 11 is a cross-sectional view of a further embodiment of the invention apparatus, illustrating the mounting of the invention apparatus from the mold cavity side and suitable for a variety of coacting sleeve and pin embodiments.

The injection apparatus of the FIG. 11 embodiment is intended for mounting into the mold 24 from the mold cavity side 20. In the apparatus of FIG. 11, a sleeve 52 is received in mold part 24 and includes an upstream bore portion 52a and an enlarged downstream bore portion 52b. A pin 53 of generally uniform diameter is positioned in sleeve 52 and includes and upstream pin portion 53a having a close fit with bore portion 52a and a downstream pin portion 53b coacting with bore portion 52b to define an annular axial passageway 54. A distribution groove 53c is provided at the juncture of pin portions 53a and 53b and an axial linear groove or recess 53d in pin portion 53a defines a linear axial passage 56 for communicating the gas source with annular axial passage 54.

The invention will be seen to provide a gas injection apparatus having many important advantages. Specifically, the gas injection apparatus of the invention provides a simple and inexpensive construction and ensures an adequate flow of gas to and from the mold cavity and yet inhibits the formation of resin blockage in the apparatus. More specifically, the invention provides a gas injection apparatus wherein the clearance defined by the annular passageway leading to the mold cavity may be carefully selected to suit the peculiar flow characteristics of the particular resin being used and the pin structure ensures that the clearance will not be enlarged due to pin eccentricity to a point where resin blockage may occur.

Whereas preferred embodiments of the invention have been illustrated and described in detail it will be apparent that various changes may be made in the disclosed embodiments without departing from the scope or spirit of the invention. For example, the invention apparatus may be mounted for fixed or reciprocating movement to inject the gas into the resin at any location including the sprue, a runner, or an article defining cavity.

What is claimed is:

1. A gas injection apparatus for use with a gas assisted injection molding system, the gas injection apparatus including means defining a bore communicating upstream with a source of gas and downstream with a mold cavity, and a pin positioned in the bore and coacting with the bore to define a gas flow passage therebetween for movement of gas from the gas source to the mold cavity, characterized in that the bore includes a downstream bore portion and an upstream bore portion adjoining the downstream portion;

the pin includes a downstream pin portion positioned in the downstream bore portion and an upstream pin portion adjoining the downstream pin portion and positioned in the upstream bore portion;

the downstream bore portion has a diameter greater than the downstream pin portion so as to define an annular axial passage between the downstream bore portion and the downstream pin portion;

the upstream bore portion has a diameter generally corresponding to the diameter of the upstream pin portion;

the annular interface of the upstream bore portion and the upstream pin portion includes a radial recess at at least one circumferential location around the annular interface defining a linear axial passage extending axially through the annular interface and communicating with the annular axial passage;

the generally corresponding diameters of the upstream bore portion and the upstream pin portion define a close fit which is operative to substantially preclude radial migration of said upstream pin Portion with respect to said upstream bore portion to maintain the downstream pin portion concentrically positioned in the downstream bore portion so as to maintain a substantially uniform radial clearance dimension throughout the circumferential extent of the annular axial passage to allow free flow of gas through said annular axial passage into said cavity while resisting entry of resin into the annular axial passage.

2. A gas injection apparatus according to claim 1 wherein the radial recess and the linear axial passage defined thereby are defined in the periphery of the upstream pin portion.

3. A gas injection apparatus according to claim 1 wherein the bore is defined by a sleeve adapted to be mounted into the mold.

4. A gas injection apparatus according to claim 3 wherein the sleeve extends into the mold cavity.

5. A gas injection apparatus according to claim 1 wherein the radial clearance dimension formed in the annular axial passage is at least twice the radial clearance dimension formed by the generally corresponding fit between the upstream bore portion and the upstream pin portion.

6. A gas injection apparatus according to claim 1 wherein the upstream and downstream bore portions are in fixed relationship to the upstream and downstream pin portions.

7. A gas injection apparatus according to claim 3 wherein the pin is secured in the sleeve.

8. A gas injection apparatus according to claim 3 wherein the pin is secured within the bore by the sleeve.

9. A gas injection apparatus for use with a gas assisted injection molding system, the gas injection apparatus including means defining a bore communicating upstream with a source of gas and downstream with a mold cavity, and a pin positioned in the bore to define a gas flow passage therebetween for movement of gas from the gas source to the mold cavity, characterized in that:

the bore includes a first upstream portion and a second downstream portion adjoining the first portion;

the pin includes a first upstream portion positioned in the first bore portion and a second downstream portion adjoining the first pin portion and positioned in the second bore portion;

the pin has a substantially uniform diameter throughout the first and second pin portions generally corresponding to the diameter of the second bore portion; and the periphery of the second pin portion is radially recessed at at least one circumferential location around the periphery of the second pin portion to define an axial linear passageway between the second pin portion and the second bore portion.

10. A gas injection apparatus according to claim 9 wherein;

the bore further includes a third portion downstream of and adjoining the second bore portion;

the pin further includes a third portion downstream of an adjoining said second pin portion, and positioned in said third bore portion and having a diameter less than the diameter of said third bore portion so as to define an annular axial passageway therebetween communicating at its upstream end with the downstream end of said axial linear passageway.

11. A gas injection apparatus according to claim 10 wherein the diameter of said third bore portion is essentially equal to the diameter of said second bore portion.

12. A gas injection apparatus according to claim 11 wherein the pin further includes a circumferencial groove proximate the juncture of said second and third pin portions.

13. A gas injection apparatus according to claim 9 wherein the first bore portion has a diameter greater than the second bore portion so as to define an annular axial passageway between the first bore portion and the first pin portion communicating at its downstream end with the upstream end of said axial linear passageway.

14. For use with a gas assisted injection molding system, a gas injection apparatus including means defining a bore communicating upstream with a source of gas and downstream with a mold cavity:

the bore including a first upstream portion and a second downstream portion adjoining the first upstream portion and having a lesser diameter than the first portion;

the pin including a first upstream portion positioned in the first bore portion and a second downstream portion adjoining the first portion and positioned in the second bore portion;

the pin having a substantially uniform diameter throughout said first and second pin portions generally corresponding to the diameter of said second bore portion, whereby to define a close fit between the second bore portion and the second pin portion and define a clearance between the first bore portion and the first pin portion; and the periphery of said second pin portion being radially recessed at at least one circumferential location around the periphery of the second pin portion to define an axial linear passageway between the second pin portion and the second bore portion communicating at an upstream end thereof with said clearance.

15. A gas delivery apparatus according to claim 14 wherein;

the bore includes a further, third portion downstream of and adjoining said second bore portion; and the pin further includes a third portion downstream of an adjoining said downstream pin portion and positioned in and having a diameter less than said third bore portion so as to define an annular axial passageway therebetween communicating at its upstream end with the downstream end of said axial linear passageway.

16. A gas injection apparatus according to claim 15 wherein the diameter of said third bore portion is essentially equal to the diameter of said second bore portion.

17. A gas injection apparatus according to claim 15 wherein the pin further includes a circumferencial groove at the juncture of said second and third pin portions.

18. A gas injection apparatus according to claim 14 wherein the bore is defined by a sleeve adapted to be mounted into the mold.

19. A gas injection apparatus according to claim 18 wherein the sleeve is sized to fit in a bore provided in a mold member forming a part of the gas assisted injection molding system; and the gas injection apparatus further includes a threaded portion threadably received in the bore in the mold member and serving to fix the sleeve in the mold member bore.

20. For use with a gas assisted injection molding system, a gas injection apparatus for delivering gas from a source of gas to a mold cavity, the injection apparatus including:

a sleeve positioned in a mold bore and defining a sleeve bore communicating upstream with the source of gas and downstream with the mold cavity; and a pin positioned in the sleeve bore and coacting with the sleeve bore to define passage means therebetween for movement of gas from the gas source to the mold cavity;

the sleeve bore including a first upstream portion, a second portion downstream of and adjoining the first portion and having a lesser diameter than the first portion, and a third portion downstream of and adjoining the second portion and having the same diameter as the second portion;

the pin including a first upstream portion positioned in the first upstream bore position, a second portion adjoining the first upstream portion and positioned in the second bore portion, and a third portion adjoining the second portion and positioned in the third bore portion;

the pin having a substantially uniform diameter throughout said first and second pin portions generally corresponding to the diameter of said second bore portion, whereby to define a close fit between the second bore portion and the second pin portion and define a clearance between the first bore portion and the first pin portion, and having a lesser diameter in said third portion, whereby to define an annular axial passage between the third pin portion and the third bore portion;

the periphery of said second pin portion being radially recessed at at least one circumferential location around the periphery of the second pin portion to define an axial linear passageway between the second pin portion and the second bore portion communicating at an upstream end thereof with said clearance and communicating at a downstream end thereof with said annular passage.

21. A gas injection apparatus according to claim 20 wherein, the periphery of said second pin portion is configured in cross section to define a plurality of axially extending circumferentially spaced recesses interconnected by a plurality of full diameter axially extending land portions, the recesses coacting with the second sleeve bore portion to define a plurality of circumferentially spaced linear axial passageways therebetween communicating upstream with the clearance and downstream with the annular passage, the land portions coacting with the second sleeve bore portion to maintain the pin in concentric relation with respect to the sleeve bore.

22. A gas injection apparatus according to claim 20 wherein an annular distribution groove is defined proximate the juncture of the second and third bore portions communicating upstream with the axial linear passageway and downstream with the annular axial passage and operative to distribute gases flowing linerally through the linear axial passage circumferentially uniformly to the annular axial passage.

23. A gas injection apparatus according to claim 20 wherein;

the gas injection apparatus further includes a plug positioned in the mold bore upstream of the sleeve and operative to fix the sleeve in the bore and fix the pin in the sleeve.

24. A gas injection apparatus for use with a gas assisted injection molding system, the gas injection apparatus including a sleeve and a pin coacting with the sleeve to define a gas flow passage for communicating a source of gas with a mold cavity, characterized in that;

the sleeve includes upstream and downstream bore portions coacting with the pin;

the pin includes an upstream portion positioned in the upstream bore portion and a downstream pin portion positioned in the downstream bore portion;

the upstream bore portion has a diameter generally corresponding to the diameter of the upstream pin portion;

the downstream bore portion has a diameter greater than the diameter of the downstream pin portion to define an annular axial passage between the downstream pin portion and the downstream bore portion;

the annular interface of the upstream bore portion and the upstream pin portion includes a radial recess at at least one circumferential location around the interface defining a linear axial passage extending axially through the interface and communicating with the annular axial passage; and the generally corresponding diameters of the upstream bore portion and the upstream pin portion define a close fit which is operative to substantially preclude radial migration of said upstream pin portion with respect to said upstream bore portion so as to maintain a substantially uniform radial clearance in the annular axial passage to allow free flow of gas through said annular axial passage into said cavity while resisting entry or resin into the annular axial passage.

25. A gas injection apparatus for use with a gas assisted injection molding system, the gas injection apparatus including means defining a bore communicating upstream with a source of gas and downstream with a mold cavity, and a pin positioned in the bore and coacting with the bore to define a gas flow passage therebetween for movement of gas from the gas source to the mold cavity, characterized in that:

the bore includes a downstream bore portion and an upstream bore portion adjoining the downstream portion;

the pin includes a downstream pin portion positioned in the downstream bore portion and an upstream pin portion adjoining the downstream pin portion and positioned in the upstream bore portion;

the downstream bore portion has a diameter greater than the downstream pin portion so as to define an annular axial passage between the downstream bore portion and the downstream pin portion;

the upstream bore portion has a diameter generally corresponding to the diameter of the upstream pin portion;

the annular interface of the upstream bore portion and the upstream pin portion includes a radial recess at at least one circumferential location around the annular interface defining a linear axial passage extending axially through the annular interface and communicating with the annular axial passage;

the generally corresponding diameters of the upstream bore portion and the upstream pin portion define a close fit to maintain the downstream pin portion centered in the downstream bore portion so as to maintain a substantially uniform radial clearance dimension throughout the circumferential extent of the annular axial passage; and an annular distribution groove is defined proximate the juncture of the upstream and downstream bore portions communicating upstream with the linear axial passage and downstream with the annular axial passage and operative to distribute gases flowing linearly through the linear passage circumferentially uniformly to the annular axial passage.

26. A gas injection apparatus for use with a gas assisted injection molding system, the gas injection apparatus including means defining a bore communicating upstream with a source of gas and downstream with a mold cavity, and a pin positioned in the bore and coacting with the bore to define a gas flow passage therebetween for movement of gas from the gas source to the mold cavity, characterized in that:

the bore includes a downstream bore portion and an upstream bore portion adjoining the downstream portion;

the pin includes a downstream pin portion positioned in the downstream bore portion and an upstream pin portion adjoining the downstream pin portion and positioned in the upstream bore portion;

the downstream bore portion has a diameter greater than the downstream pin portion so as to define an annular axial passage between the downstream bore portion and the downstream pin portion;

the upstream bore portion has a diameter generally corresponding to the diameter of the upstream pin portion and substantially equal to the diameter of the downstream bore portion;

the annular interface of the upstream bore portion and the upstream pin portion includes a radial recess at at least one circumferential location around the annular interface defining a linear axial passage extending axially through the annular interface and communicating with the annular axial passage; and the generally corresponding diameters of the upstream bore portion and the upstream pin portion define a close fit to maintain the downstream pin portion centered in the downstream bore portion so as to maintain a substantially uniform radial clearance dimension throughout the circumferential extent of the annular axial passage.

27. A gas injection apparatus for use with a gas assisted injection molding system, the gas injection apparatus including means defining a bore communicating upstream with a source of gas and downstream with a mold cavity, and a pin positioned in the bore and coacting with the bore to define a gas flow passage therebetween for movement of gas from the gas source to the mold cavity, characterized in that:

the bore includes a downstream bore portion and an upstream bore portion adjoining the downstream portion;

the pin includes a downstream pin portion positioned in the downstream bore portion and an upstream pin portion adjoining the downstream pin portion, positioned in the upstream bore portion, and having a diameter substantially equal to the diameter of the downstream pin portion;

the downstream bore portion has a diameter greater than the downstream pin portion so as to define an annular axial passage between the downstream bore portion and the downstream pin portion;

the upstream bore portion has a diameter generally corresponding to the diameter of the upstream pin portion;

the annular interface of the upstream bore portion and the upstream pin portion includes a radial recess at at least one circumferential location around the annular interface defining a linear axial passage extending axially through the annular interface and communicating with the annular axial passage; and the generally corresponding diameters of the upstream bore portion and the upstream pin portion define a close fit to maintain the downstream pin portion centered in the downstream bore portion so as to maintain a substantially uniform radial clearance dimension throughout the circumferential extent of the annular axial passage.

28. A gas injection apparatus for use with a gas assisted injection molding system, the gas injection apparatus including means defining a bore communicating upstream with a source of gas and downstream with a mold cavity, and a pin positioned in the bore and coacting with the bore to define a gas flow passage therebetween for movement of gas from the gas source to the mold cavity, characterized in that:

the bore includes a downstream bore portion and an upstream bore portion adjoining the downstream portion;

the pin includes a downstream pin portion positioned in the downstream bore portion and an upstream pin portion adjoining the downstream pin portion and positioned in the upstream bore portion;

the downstream bore portion has a diameter greater than the downstream pin portion so as to define an annular axial passage between the downstream bore portion and the downstream pin portion;

the upstream bore portion has a diameter generally corresponding to the diameter of the upstream pin portion;

the generally corresponding diameters of the upstream bore portion and the upstream pin portion define a close fit to maintain the downstream pin portion centered in the downstream bore portion so as to maintain a substantially uniform radial clearance dimension throughout the circumferential extent of the annular axial passage; and the periphery of the upstream pin portion is configured in cross-section to define a plurality of axially extending circumferentially spaced recesses interconnected by a plurality of full diameter axially extending land portion, the recesses coacting with the upstream bore portion to define a plurality of circumferentially spaced linear axial passages therebetween communicating upstream with the source of gas and downstream with the annular axial passage.

29. A gas injection apparatus for use with a gas assisted injection molding system, the gas injection apparatus including a sleeve and a pin coacting with the sleeve to define a gas flow passage for communicating a source of gas with a mold cavity, characterized in that;

the sleeve includes upstream and downstream bore portions coacting with the pin;

the pin includes an upstream portion positioned in the upstream bore portion and a downstream pin portion positioned in the downstream bore portion;

the upstream bore portion has a diameter generally corresponding to the diameter of the upstream pin portion;

the downstream bore portion has a diameter greater than the diameter of the downstream pin portion to define an annular axial passage between the downstream pin portion and the downstream bore portion;

the annular interface of the upstream bore portion and the upstream pin portion includes a radial recess at at least one circumferential location around the interface defining a linear axial passage extending axially through the interface and communicating with the annular axial passage;

the generally corresponding diameters of the upstream bore portion and the upstream pin portion define a close fit so as to maintain a substantially uniform radial clearance in the annular axial passage; and an annular distribution groove is defined between the upstream and downstream bore portions to uniformly distribute the flow of gas from the linear axial passage circumferentially into the annular axial passage.

* * * * *